United States Patent [19]

Martin

[11] Patent Number: 4,583,034
[45] Date of Patent: Apr. 15, 1986

[54] COMPUTER PROGRAMMED BATTERY CHARGE CONTROL SYSTEM

[76] Inventor: Robert L. Martin, 649 Kendale La., Thousand Oaks, Calif. 91360

[21] Appl. No.: 630,405

[22] Filed: Jul. 13, 1984

[51] Int. Cl.$^4$ .............................................. H02J 7/00
[52] U.S. Cl. ...................................... 320/21; 320/25; 320/33; 320/40; 320/48
[58] Field of Search ...................... 320/21, 25, 31, 32, 320/33, 39, 40, 43, 44, 45, 48

[56] References Cited

U.S. PATENT DOCUMENTS

| | | | |
|---|---|---|---|
| 3,794,905 | 2/1974 | Long | 320/39 |
| 3,886,427 | 5/1975 | Long | 320/39 |

*Primary Examiner*—Patrick R. Salce
*Assistant Examiner*—Anita M. Ault
*Attorney, Agent, or Firm*—William H. Maxwell

[57] ABSTRACT

A computer programmed battery control system responsive to current flow during charge and discharge conditions and comprised of a microcomputer and memory programmed to respond to current passing through a battery shunt; to determine charge condition, to govern shut-off point of charge, to indicate a bad battery or cell thereof, to warn of extreme discharge, to show and cope with power interrupts, to govern long term storage of batteries without overcharge, and to indicate ampere hours consumed between charges.

40 Claims, 7 Drawing Figures

COMPUTER PROGRAMMED BATTERY CHARGE CONTROL SYSTEM

BACKGROUND

The marked increase in battery usage has created a need for an improved battery control system. The majority of prior art charging systems incorporate voltage level of the battery as a reference to determine the level of charge, and this method has many drawbacks. Firstly, a small change in voltage of −1% with a corresponding 0.4 volt change with a 36 volt system represents a 10% change in estimated battery capacity. Secondly, this small change is also affected by the load in amperes on the battery. Thirdly, temperature of the electrolyte and the specific gravity of the electrolyte cause further inaccuracies when voltage is used as a reference.

The battery control system disclosed herein monitors battery capacity using a novel idea of means employing the latest technologies, incorporating a microcomputer to convert load current of the battery into ampere hours. The ampere hours are then converted into percentage of battery capacity and displayed as "Battery Capacity Remaining", analogous to a fuel level gauge. Software programming in the microcomputer is used to control functions that are incorporated in this battery control system. The system determines the appropriate charger turn-off point, it indicates a bad battery or cell, it gives a warning of extreme discharge conditions, it shows lack of charging power when the charger is plugged in, it automatically handles power interrupts, and it governs long term storage of batteries without overcharge. An external or built-in electronic or electromechanical counter is connected to the battery control system to indicate the ampere hours total consumed by the equipment, and during discharge this indicator or counter accumulates ampere hours and then outputs that value to the display. The amount of overcharge appropriate for the particular battery is readily selected for accurate turn-off of the charger, thereby extending battery life and minimizing water boil-off during charge.

It is a general object of this invention to convert load current of the battery into ampere hours seen as a percentage of the battery capacity and displayed as a remaining quantity of energy. It is also an object of this invention to provide control of battery charging by means of software programming in a microcomputer, to determine charge turn-off and charge turn-on points, to indicate a bad battery or cell thereof, to warn of extreme discharge conditions, to show lack of power to the charger, to automatically handle power interruptions, to permit long term storage without overcharge, to count and display ampere hours consumed, and to selectively determine the amount of overcharge for a particular battery or set of batteries.

The foregoing and various other objects and features of this invention will be apparent and fully understood from the following detailed description of the typical preferred form and applications thereof, throughout which description reference is made to the accompanying drawings.

DRAWINGS

Figure 6:
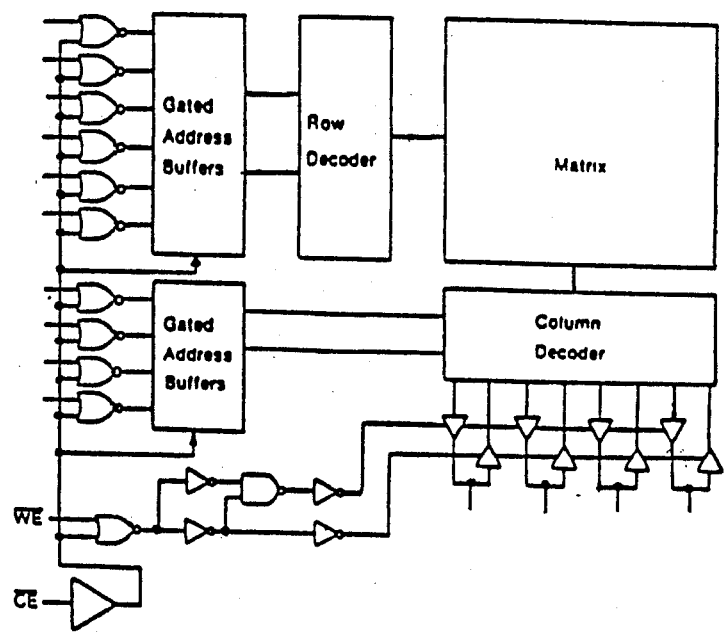

And FIG. 6 is the manufacturer's schematic diagram of the Random Access Memory.

PREFERRED EMBODIMENT

Figure 1:
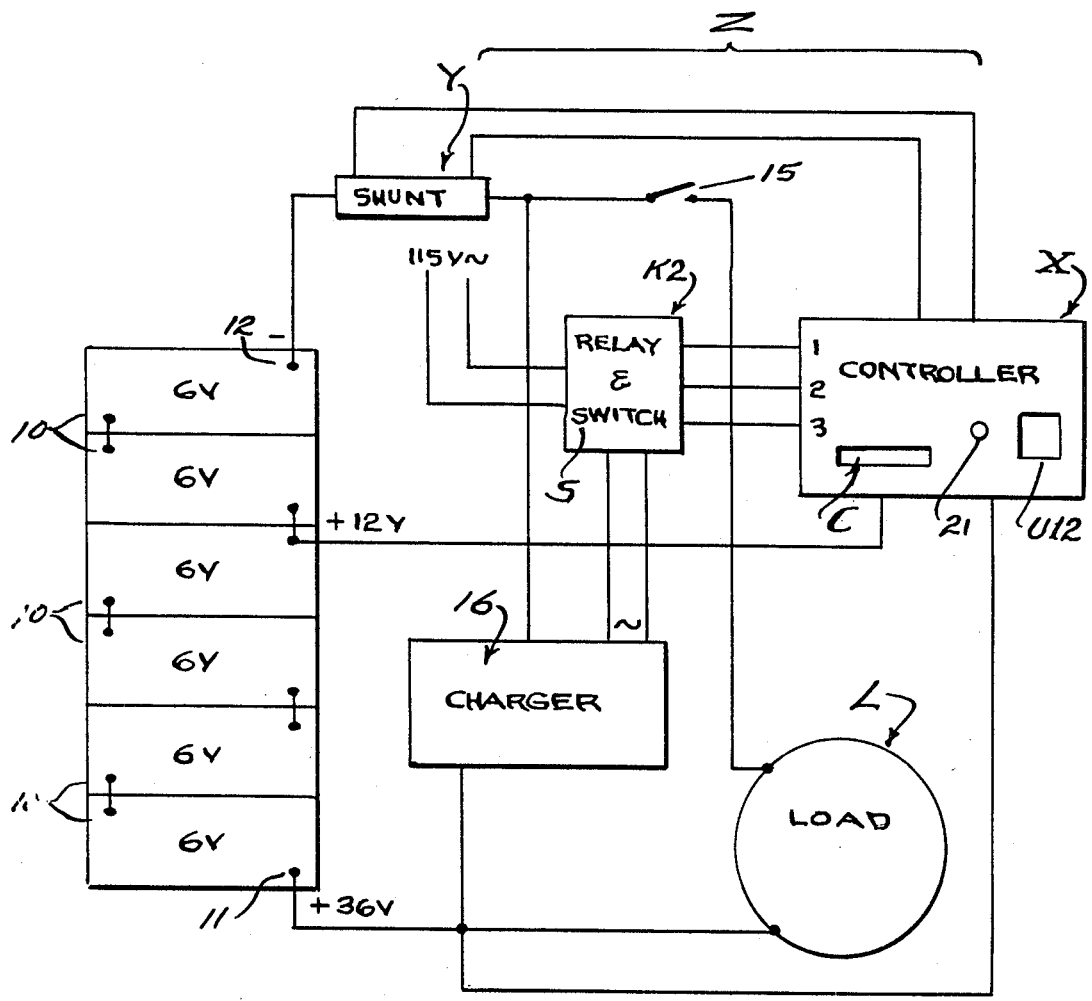
FIG. 1 is a block diagram of the Computer Programmed Battery Control System of the present invention, showing its relationship to the load and to the charger.

Referring now to the drawings, FIG. 1 is a block diagram of the Computer Programmed Battery Control System, showing the general arrangement of the controller unit X and its relationsip to the batteries 10 to be maintained in a charged state and topped-off condition. That is, the batteries are automatically returned to the full charge when this system is put into operation. Also shown in this block diagram is the relationship of the system to the load L and to the charger 16, the system being characterized by a shunt Y to which the system responds. In practice, this is a plug-in system that involves a cable assembly Z (see FIG. 4) for connecting a 115 volt power cord to the charger 16, with a remote relay incorporated therein and responsive to the controller unit.

Figure 2:
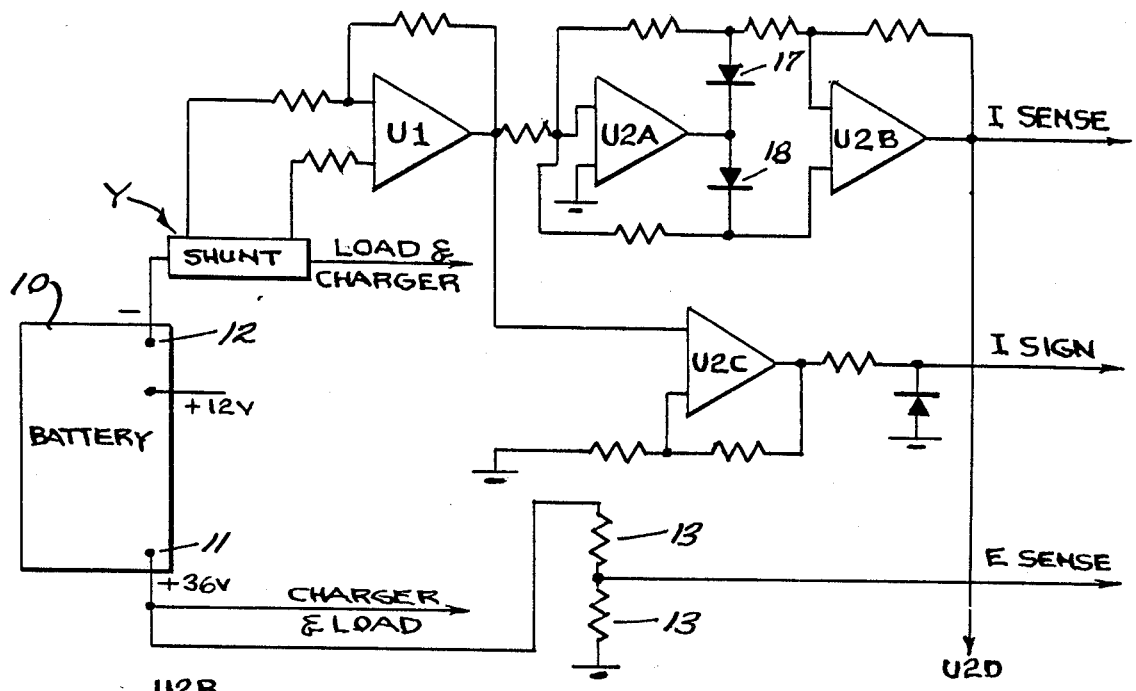
FIG. 2 is an electrical diagram showing the current, voltage and polarity sensing portions of the circuitry.

Referring to FIG. 2 of the drawings, there is shown a portion of the circuitry required to produce a positive input of current sense, an input to indicate discharge or charge and a voltage sense checking the voltage of the batteries loaded and unloaded. The following inputs to a computer means and processed thereby are: current I SENSE, polarity I SIGN, and voltage E SENSE. As shown, there is a battery system comprised of six 6 volt batteries 10 in series to produce 36 volts with the positive terminal 11 connected to the charger 16 through a plug P (see FIG. 4) and also connected to the load L (see FIG. 1) and to a voltage sense means comprised of a voltage divider circuit having a pair of resistors 13 and a ground, that produces a voltage equivalent to a greater than reference voltage of the computer means (U9) and referred to herein as the input E SENSE.

Figure 1A:
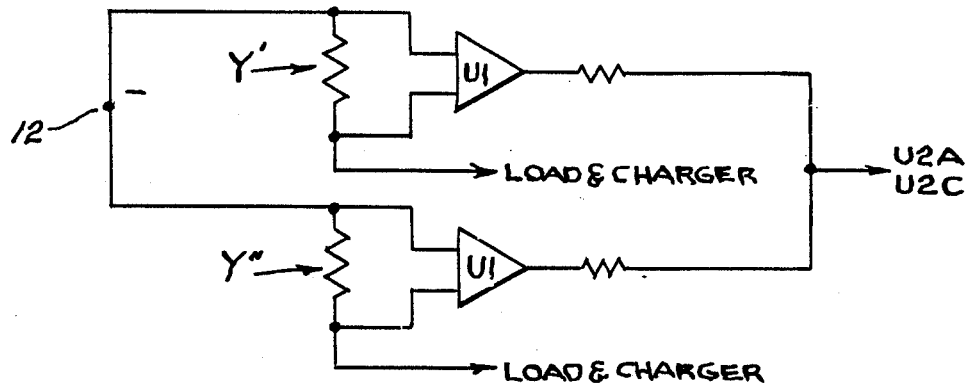
FIG. 1a an electrical diagram of a typical shunt circuit to which the control system responds.

The shunt Y is connected to the negative terminal 12 of the batteries at its one end and to the load L and charger plug P at its other end. When the appropriate switching circuitry, such as charger 16 or switch 15, is closed and current is flowing through the shunt, a voltage equivalent, for example, to 200 microvolts per ampere is produced at the shunt leads. When the charger 16 is plugged in (load disconnected) a voltage of, for example, 200 microvolts per ampere of the opposite polarity is produced at the shunt leads. These voltages are processed by a voltage sense means comprised of a series of operational amplifiers U1, U2A and U2B, said voltages from shunt Y being fed into the input of said first operational amplifier U1 and amplified to produce, for example, +0.008 volt per ampere charge or −0.008 volt per ampere discharge, as the case may be. Alternately, two or more load shunts Y′ and Y″ can be employed as shown in FIG. 1a; Y′ of high resistance in a charge circuit, and Y" of low resistance in a discharge circuit, and each to a first operational amplifier U1 with load resistors and to a second operational amplifier as next described. The output of amplifier U1 is fed into the inverting input of said second operational amplifier U2A, the output of which produces + or − voltage to a pair of current rectifying diodes 17 and 18, thereby producing an output to said third operational amplifier U2B that has a positive value of, for example, 0.113 volts per ampere charge or, for example, 0.017 volts per ampere discharge, and referred to herein as the input current I SENSE. These values are the result of the amplifier gains and are determined by calculations programmed in the computer software.

The changeable polarity output or amplifier U1 is also processed by a current sense means comprised of a current responsive operational amplifier U2C, the output of amplifier U1 being connected to the inverting input of said forth operational amplifier U2C having an output referred to herein as the input current I SIGN to the microcomputer U9, so as to determine the discharge or charge mode, as the case may be. Various power supply connections and grounds, as well as resistors and diodes are employed as circumstances require and as indicated in the drawings.

Figure 3:
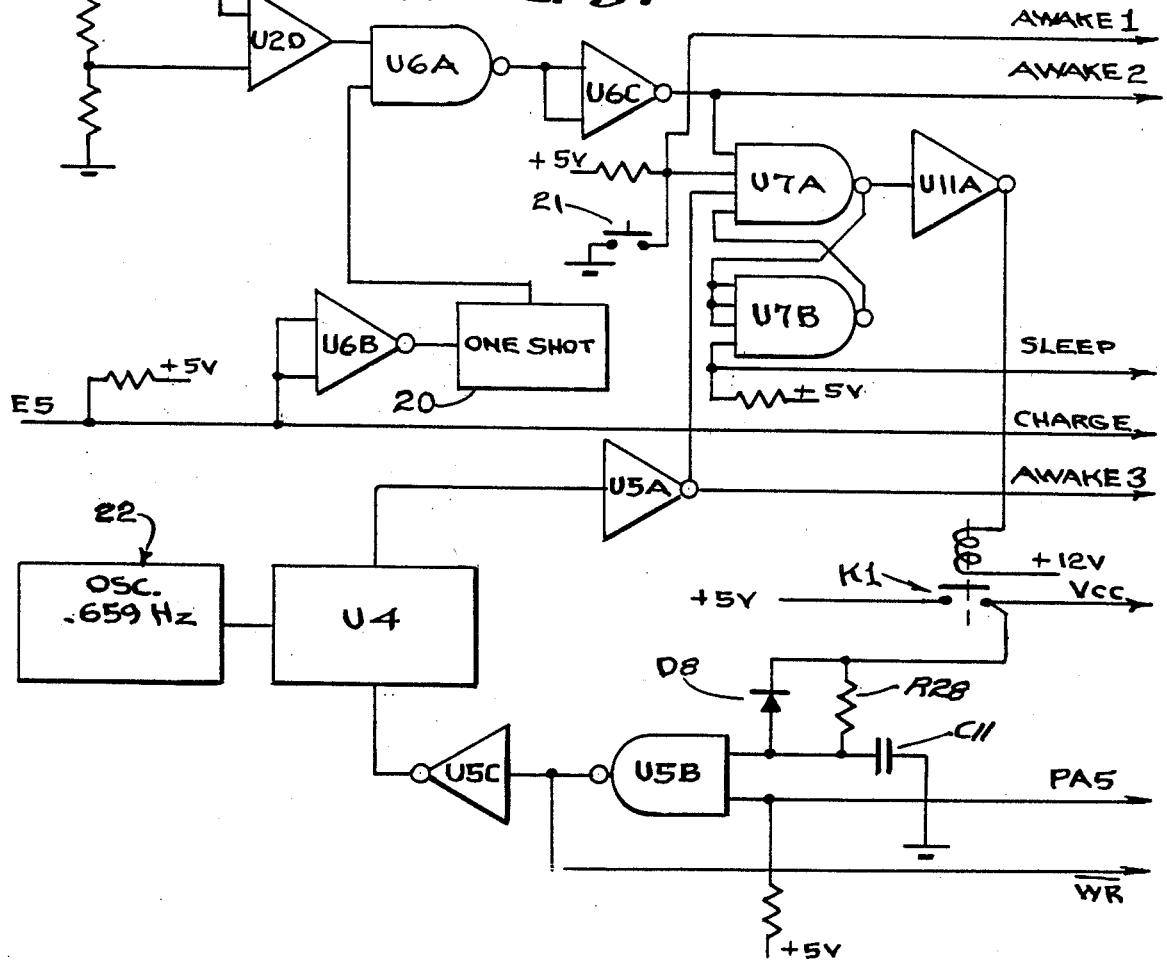
FIG. 3 is an electrical diagram showing the program responsive outputs of the circuitry.

Referring now to FIG. 3 of the drawings, there is shown a circuitry that produces the following inputs to the computer means shown herein as a microcomputer U9; AWAKE 1, AWAKE 2, AWAKE 3, ASLEEP, and +5 Vcc, POWER UP, as will be described.

The current sense output of amplifier U2B is processed by awake means comprised of an operational amplifier U2D and its following circuitry. In order to conserve power, the microcomputer is turned off (goes to sleep) after a time period of for example one minute with no charge or discharge input from amplifier U2B. When the current sense from U2B increases above a threshold of, for example, 0.142 volts at the inverting input of the operational amplifier U2D, the output of a NAND gate U6A goes high, and through the output of a following inverter U6C goes low. This inverted output produces a low input referred to herein as AWAKE 2 to the microcomputer U9. The inverted output of a first inverter causes a flip flop comprised of NAND gates U7A and U7B to go high at the output of a second inverter U11A, causing it to go low and to energize the coil of relay K1, so as to close said relay and thereby produce +5 volts at the microcomputer U9 and powering it up, an output referred to herein as the input AWAKE 2 to the microcomputer U9. The said microcomputer will remain awake for a time period of, for example, one minute (by means of software program) after charge or discharge current goes below the threshold and then it goes to sleep. This same AWAKE 2 condition is produced when the amplifier U2B output is below the threshold and the charger plug P is plugged in causing the plug P jumper connection E5 to go low through a third inverter U6B. This triggers a one shot means 20 feeding enabled NAND gate U6A who's output is inverted by inverter U6C to trigger the flip flop U7A-U7B, the output of U7A being inverted by inverter U11A causing relay K1 to close, putting microcomputer U9 into the AWAKE 2 mode. The flip flop U7A-U7B is also triggered when a calibrate switch 21 is manually closed, putting the microcomputer U9 into the AWAKE 1 mode.

Sleep means comprised of an oscillator and counter and associated circuitry as next described, checks battery charge on a time to time basis. An oscillator 22 with a period of, for example, 0.66 seconds causes an output of a binary counter U4 to occur every three hours. This is inverted by inverter U5A and triggers the flip flop U7A-U7B putting the microcomputer U9 into the condition referred herein as the AWAKE 3 mode, and this is used to turn on the system after every three hours of sleep in the event of a power failure or the like will automatically complete a partial charge that may have been turned off for any period of time.

The SLEEP output PA7 of the microcomputer U9 enables NAND gate U7B to permit the flip flop to go to the AWAKE 3 mode, while the AWAKE 2 output PA6 of the microcomputer enables NAND gate U7A for the AWAKE 2 mode. When the three hour AWAKE 3 causes the microcomputer to wake up, the program checks the charge state and if the batteries require charging it continues the charge until completion. At the end of the program check, the microcomputer U9 outputs a pulse at PA5 that resets the counter U4 to start another three hour period of sleep. The output from PA5 is fed to an enabled NAND gate U5B and is inverted by a fifth inverter U5C to reset the counter U4. The other input to the NAND gate U5B is through a delay circuit that enables the gate to inhibit writing transfer of data to a memory means shown herein as a Random Access Memory (RAM) U10. This is accomplished with a network comprised of a capacitor C11, a diode D8 and a resistor R28, as shown. This ensures that the microcomputer is in a stable condition prior to transfer of data to the RAM. Various power supply connections and ground, as well as resistors and diodes are employed as circumstances require and as indicated in the drawings.

When the microcomputer U9 is powered down and goes to sleep, it loses all stored data not in its permanent memory, and before entering into the sleep mode it is programmed to transfer data to the RAM U10. NAND gate U5B is enabled high at one input by the +5 volts from the relay K2, while its other input is connected to PA5 of the microcomputer. This pin or port controls writing data to the memory U10 (high to write and low to read). Data is transferred to the memory U10 where it is stored until the microcomputer is activated. When the microcomputer is awake and stabilized the data is returned to the memory of the computer. The data transfer is controlled by an output from the microcomputer at PA4 to the not enable $\overline{EN}$ of the RAM U10. A portion of the output pins or ports of the microcomputer (PB0 through and including PB6) are used to code a seven segment readout U12. The codes read at the readout are 2, 3, 4, 5, 6, 7, 8, 9, H, L, U, E, F, C, d and =. The codes 2 through 9 indicate percent of battery capacity remaining. The code H indicates fully charged battery. The code L indicates low battery. The code U indicates charger unplugged or not charging. The code E indicates not calibrated (error). The code F indicates bad battery or bad cell. Code C indicates charge mode. Code d indicates discharge mode. and, code = indicates reading ampere hours total.

Figure 4:
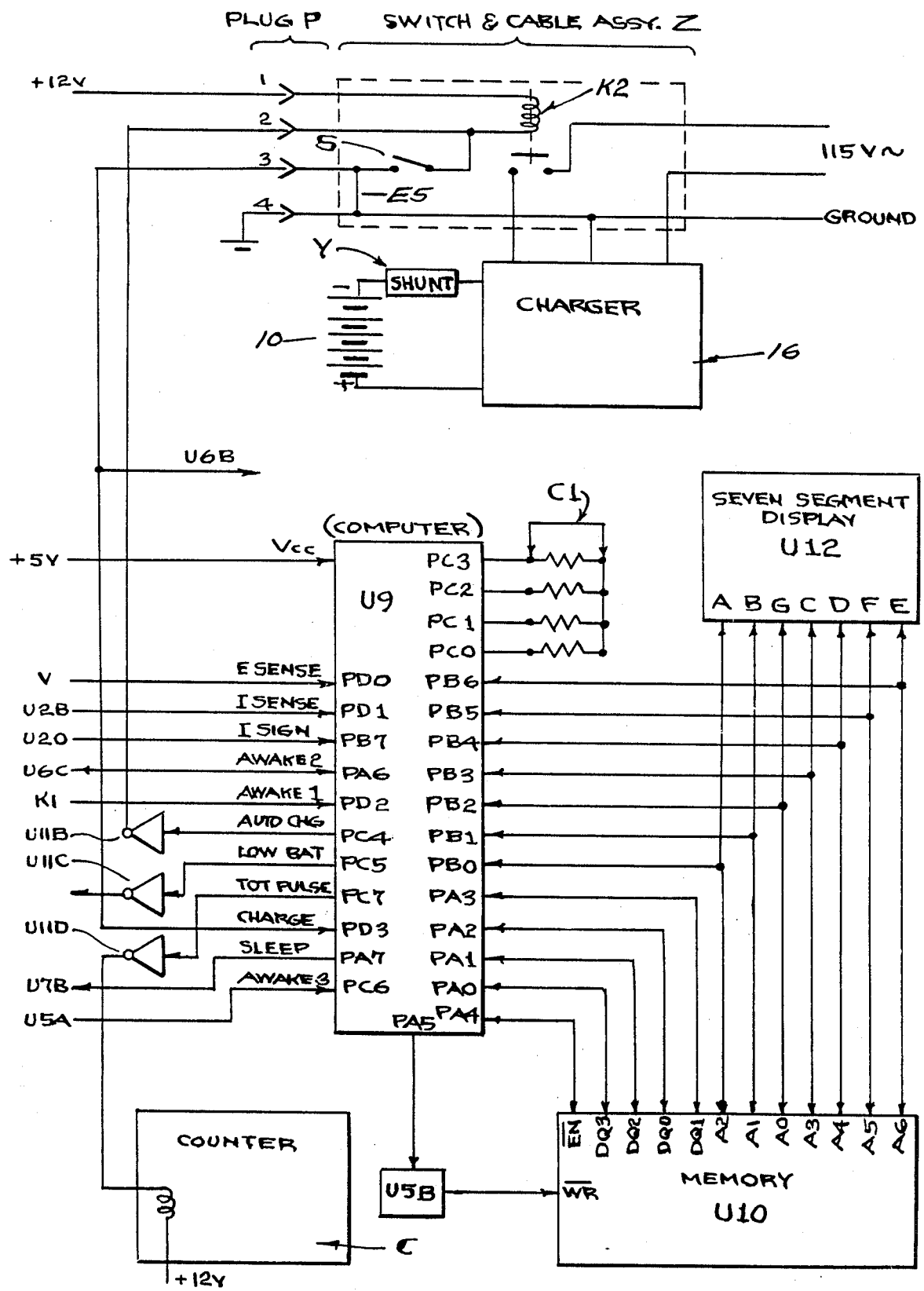
FIG. 4 is an electrical block diagram showing the microcomputer as it is combined with a Random Access Memory, a seven segment display, a counter, and a switch and cable assembly, illustrating the functions commanding and responding to the programming thereof.
Figure 5:
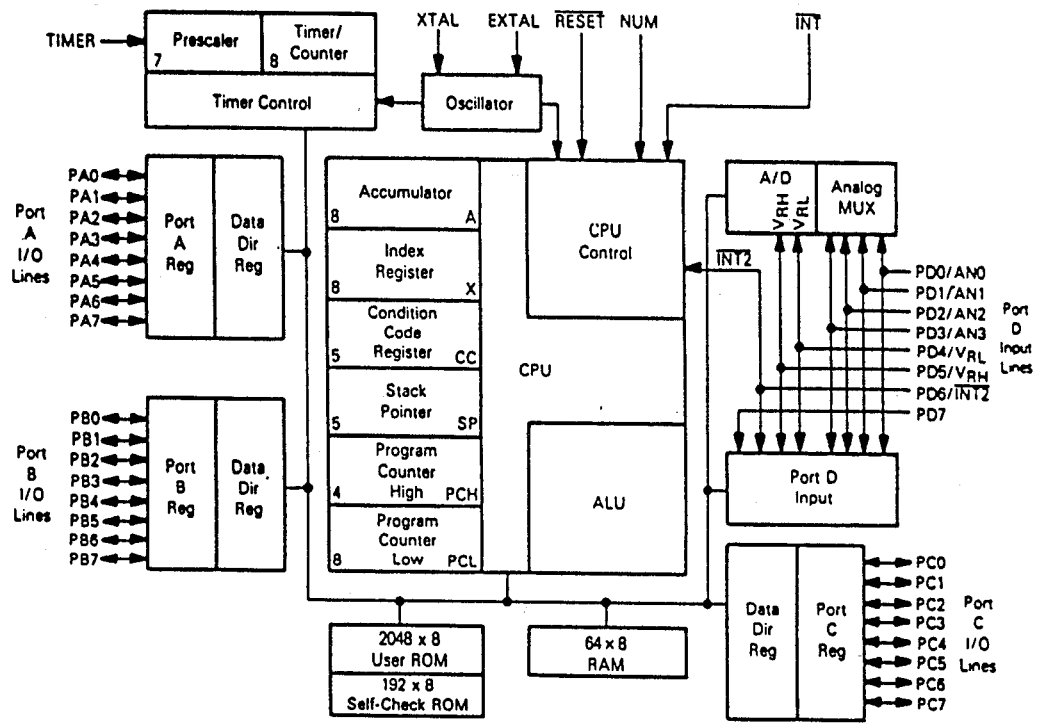
FIG. 5 is the manufacturer's schematic diagram of the microcomputer.

Referring now to FIG. 4 of the drawings, the outputs of those circuits above described and shown in FIGS. 2 and 3 are related to the microcomputer U9, which is shown as it is combined with the Random Access Memory (RAM) U10 and seven segment readout U12, a counter C and the plug P and switch and cable assembly Z that couples the charger 16 to the system and to a 115 volt 60 Hz energy source. The microcomputer U9 includes for example, four eight bit analog to digital converters in addition to its computer means, and is manufactured as No. MC6805R2 by MOTOROLA, and as shown generally by the block diagram FIG. 5 of the drawings. The Random Access Memory U10 is, for example, a 1024×4 static CMOS RAM manufactured as chip No. SCM21C14 by SOLID STATE SCIENTIFIC, and as shown generally by the block diagram FIG. 6 of the drawings. The pin or port assignments used are shown in FIGS. 4, 5 and 6.

The PD0 input of the microcomputer U9 is to a means therein responsive to the E SENSE for sensing a voltage proportionate to battery voltage, and comparing it to the microcomputer reference voltage.

The PD1 input of the microcomputer U9 is to a means therein responsive to the I SENSE for sensing voltage proportionate to current flow. That is, this means meters both ampere charge and discharge.

The PB7 input of the microcomputer U9 is to a means therein responsive to the I SIGN for indicating the direction of current flow through the shunt assembly, thereby determining charge or discharge.

The PA6 input of the microcomputer U9 is from a means therein signalling the awake 2 when power reset interrupt is caused by shunt current exceeding a certain value, for example 7.8 ampere discharge or 0.14 ampere charge.

The PD2 input of the microcomputer U9 is from a means therein responsive to the AWAKE 1 calibrate mode push button 21 switch input.

The PC4 output of the microcomputer U9 is from a means therein signalling through an inverter U11B which enables the remote relay K2 (see FIG. 4 plug connection 2) to turn the charger ON.

The PC5 output of the microcomputer U9 is from a means therein signalling through an inverter U11C to indicate a low battery condition, or to disable the load.

The PC7 output of the microcomputer U9 is from a means therein signalling through an inverter U11D which produces pulses to the counter C, totalizing in increments once per pulse, for example each pulse signifying a tenth ampere hour used since the last reading.

The PD3 input of the microcomputer U9 is to a means therein responsive to the plug P shunt E5, causing the input of the microcomputer to go low.

The PA7 output of the microcomputer U9 is to a means therein signalling the SLEEP (U7B), a command which puts itself to sleep by setting the "SLEEP-WAKE" flip flop U7A-U7B and disconnecting the power supply from the microcomputer U9.

The PC6 input of the microcomputer U9 is to a means therein responsive to AWAKE 3 from inverter U5A for determining when power reset interrupt is caused by the three hour time set.

The PC0, PC1, PC2 and PC3 inputs of the microcomputer U9 are to means therein respectively responsive to the absence of or to at least one or a combination of shunts C1 shorting across a resistor and for each determining a maximum limit of battery over charge, for example an overcharge of 103%, 105%, 107% or 109% of battery charge rated capacity, as selected by PC1 and/or PC2. Battery rated capacity is also selected, for example for 112 or 135 ampere hour batteries, by using or not using PC3. PC0 is not necessarily used herein.

The PB0-PB6 outputs of the microcomputer U9 are from means therein respectively signalling the Random Access Memory (RAM) U10 and the seven segment readout U12, as follows: PB0 to memory A2 and to the readout segment A, PB1 to memory A1 and to the readout segment B, PB2 to memory A0 and to the readout segment G, PB3 to memory A3 and to the readout segment C, PB4 to memory A4 and to the readout segment D, PB5 to memory A5 and to the readout segment F, PB6 to memory A6 and to the readout segment E.

The PA0-PA3 output-inputs of the microcomputer U9 extend respectively to memory circuits DQ3, DQ2, DQ0 and DQ1; for carrying data to the memory in the write cycle, or from the memory in the read cycle.

The PA4 and PA5 input-outputs from the microcomputer U9 extend respectively to the memory enable $\overline{EN}$ circuit and to the $\overline{WR}$ write circuit.

The computer means shown herein as the microcomputer U9 includes a plurality of programmed means performing various functions associated with the electronic inputs and outputs of the circuitry hereinabove described. These functions are software operated functions which are programmed into the microcomputer U9 so that the various means referred to herein respond to achieve the operational features ascribed thereto as follows.

(1) The seven segment readout U12 displays battery charge in terms of its percent of total capacity (CAPRT) equal to 100%, displayed by readout U12 as "Capacity Remaining" indicia or numerals 1 through 9 and the indicia or letter H indicating fully charged (95% or more). Accordingly, the microcomputer U9 includes means therein responsive to the current I SENSE and to the polarity I SIGN and programmed for producing discrete signals through outputs PB0-PB6 and to the segment inputs of readout U12 and into the internal memory RAM of the microcomputer and also to the input outputs A0-A6 of the external memory RAM. Said microcomputer means simultaneously signals $\overline{EN}$ and $\overline{WR}$ to read or write the CAPRT data into or from RAM U10.

(2) The relay K2 turns the charge 16 ON and OFF in response to a signal from PC4 of the microcomputer U9. Accordingly, the microcomputer includes means therein responsive to the capacity remaining CAPRT data from the internal memory RAM therein and is programmed for producing a signal through PC4 to energize relay K2 when battery charge data is less than at the fully charged condition, and alternately to deenergize the relay when the battery turn-off condition is achieved.

(3) The seven segment readout U12 displays a first "bad battery" (BADBA) condition by the display indicia (flashing) number indicating that the battery is not accepting the charge current or is passing a portion thereof as current electrolysis, a functional failure. Accordingly, the microcomputer U9 includes means therein responsive to the current I SENSE and to the polarity I SIGN changing mode and programmed for producing a blinking or flashing output at the seven segment readout U12.

(4) The seven segment readout U12 also displays a second "bad battery" (BADBA) condition by the letter F indicating that the battery is developing an abnormal internal resistance, a functional failure. Accordingly, the microcomputer U9 includes means therein responsive to the voltage E SENSE, the current I SENSE, and to the polarity I SIGN discharge mode, and programmed for producing discrete signals through outputs PB0-PB6 and to the segment inputs of readout U12 and to the input-outputs A0-A6 of the memory RAM U10 in the form of alternate letter F and the prevailing capacity remaining numeral 1 through 9 (one only). Said microcomputer means simultaneously inters this data into its internal memory RAM memory and signals $\overline{EN}$ and $\overline{WR}$ to enter the F condition data into the memory RAM U10.

(5) The seven segment readout U12 displays "low battery" condition by the letter L indicating that the battery is deeply discharged and is at or below a threshold of, for example, 20% of CAPRT, a warning that this state has been reached and requiring immediate recharge in order to avoid batter damage. Accordingly, the microcomputer U9 includes means therein responsive to the current I SENSE and to the polarity I SIGN and programmed for producing discrete signals through outputs PB0-PB6 and to the segment inputs of readout U12 and to the input-outputs A0-A6 of the memory RAM U10. Said microcomputer means signals this condition at PC5 and simultaneously enters this data into its internal RAM memory and signals $\overline{EN}$ and $\overline{WR}$ to enter the CAPRT data L condition into memory RAM U10.

(6) The seven segment readout U12 displays a "start of charge" mode for a short time interval, for example for 0.7 to 1 second, indicating by the letter C that the charge function or operation is started. Accordingly, the microcomputer U9 includes means therein responsive to the I SIGN and I SENSE and programmed for producing discrete signals for said time interval through outputs PB0-PB6 and to the inputs of readout U12 in order to display the letter C.

(7) The seven segment readout U12 displays a "start of discharge" mode for a short time interval, for example for 0.7 to 1 second, indicating by a letter d that the discharge function or operation is started. Accordingly, the microcomputer U9 includes means therein responsive to the I SIGN and I SENSE and programmed for producing discrete signals for said time interval through outputs PB0-PB6 and to the segment input of readout U12 in order display the letter d.

(8) The seven segment readout U12 displays "charger not connected" condition indicated by a letter U, continuously, that the charger is not connected or not conducting to the battery when the plug P is connected with the jumper or shunt E5 coupled to establish the AWAKE 2 mode. Accordingly, the microcomputer U9 includes means therein responsive to the I SIGN and I SENSE and programmed for producing discrete signals through outputs PB0-PB6 and to the segment inputs of readout U12 in order to display the letter U, when plug P is not connected.

(9) The seven segment readout U12 displays a "total-sending" mode indicated by an equals symbol = for the time period required to total the ampere hours consumed, at the counter C. Accordingly, the microcomputer U9 includes means therein responsive to the I SIGN and I SENSE and programmed for reading out the ampere hours total since the last charge cycle and for producing pulses to operate the counter C. And, when this total pulse mode is achieved or completed said means switches the system into the charge mode.

(10) The seven segment readout U12 displays a "power interrupt" condition by the letter E indicating that there has been a power failure or disconnection, in which case memory data is lost from the microcomputer internal RAM. Accordingly, the microcomputer U9 includes means therein responsive to the calibrate switch 21 for starting the system at a known CAPRT value or condition, for example at the value 2 (20%) or the value H (95%-100%). The said means produces discrete signals through outputs PB0-PB6 and to the segment inputs of readout U12 and into the internal memory RAM of the microcomputer and to the input-outputs A0-A6 of the memory RAM U10, in order to display the letter E, the numeral 2, or the letter H, as the case may be. Note that the system is inoperative in the E condition, and commences to operate when manually calibrated by depressing or closing switch 21 to alternately select the value 2 or H.

(11) The microcomputer U9 includes an internal 64×8 Random Access Memory that receives the external data from the aforesaid programmed means incorporated therein, all as above described. And, as clearly set forth there is the external Random Access Memory U10 which also receives the same specified data. A feature of this system is that it goes to sleep for intervals of time, with the exception of the binary counter U4 (clock) and its associated circuitry, in order to save energy, the microcomputer U9 including means therein for turning OFF or into the SLEEP mode and which involves the loss of data from the internal RAM. However, said microcomputer U9 also includes means therein for restoring data into said internal RAM by transfering it from the external RAM U10 when the AWAKE mode is reastablished, as above described. This process is instantaneous and enters the CAPRT data for computer analysis; if the Battery Capacity Remaining is the value of 9 (90%-95%) or below, the charge mode is turned ON; however, if the Battery Capacity Remaining is the value H or greater and/or fully charged, the SLEEP mode is returned to for the three hour time interval.

OPERATION

Referring now to FIG. 4 of the drawings, the charger 16 is powered by 115 volts AC (or other voltage) with two methods of control to turn the charger ON, one automatic control by the microcomputer U9, and the other by manual operation of a switch S. In order to enable the charging mode in either the automatic or manual mode, it is simply necessary to plug in the cable plug P, for example into a receptacle located on a vehicle powered by the batteries 10 to be charged. When the plug P is inserted into the receptacle, two functions are put into operation. Firstly, the charger control relay K2 is connected and shunt E5 that connects U1 and PD3 to U6B goes low telling the microcomputer that the charger plug is connected. Secondly, by making E5 low the microcomputer U9 is put into the AWAKE 2 mode, the charger relay K2 is activated by the microcomputer at PC4 feeding the input of U11A who's output is connected to the plug P. The cable side of the relay K2 coil connects the system to ground when the plug P is inserted. With power interrupt or initial connection of power from the batteries, the letter E will appear at the readout U12, and system operation is then initiated during the 0.7 to 1 second interval of time by depressing and closing switch 21 to alternately select the starting value of Battery Capacity Remaining (CAPRT), either the numeral 2 or the letter H, whichever is closest to the existant battery condition.

Having described only the typical preferred form and application of my invention, I do not wish to be limited or restricted to the specific details herein set forth, but wish to reserve to myself any modifications or variations that may appear to those skilled in the art as set forth within the limits of the following claims.

I claim:

1. A computer programmed battery charge control system responsive to charge and discharge conditions, and including;

at least one shunt passing all current from the battery to a load and between the battery and to a charger, there being a first relay switch switching the charge ON and OFF from an external power source, a current sense means in circuit with opposite ends of the shunt for producing a signal having a positive value per ampere charge and discharge, a polarity sense means in circuit with said shunt for producing a signal determining charge or discharge, a voltage sense means in circuit from the battery for producing a voltage signal equivalent to a computer reference voltage, an awake means in circuit with the signal from the current sense means for producing an awake signal to a second relay switch when the battery is less than at fully charged, and a computer having means therein in circuit with and responsive to the voltage sense means for sensing voltage proportionate to the battery voltage and comparing it to said computer reference voltage, having means therein including internal memory means in circuit with and responsive to the current sense means for sensing voltage proportionate to the current flow and storing the same as battery charge capacity remaining data, having means therein in circuit with and responsive to the polarity sense means for sensing direction of current flow through the shunt, and having means therein responsive to said voltage means, current means and polarity means and to the capacity remaining data in said memory means and programmed for producing a signal to the awake means for energizing and switching the first relay switch ON when said capacity remaining is less than at fully charged.

2. The computer programmed battery charge control system as set forth in claim 1, wherein there is a plurality of shunts and each passing current from the battery to the load and between the battery and charger.

3. The computer programmed battery charge control system as set forth in claim 1, wherein the current sense means comprises a first operational amplifier producing a plus or minus volt per ampere charge or discharge dependent upon current flow through the shunt and with an output to a second inverting input operational amplifier producing a plus or minus voltage to a pair of current rectifying diodes thereby producing an output to a third operational amplifier that has a positive value per ampere charge or discharge.

4. The computer programmed battery charge control system as set forth in claim 1, wherein the polarity sense means comprises a first operational amplifier producing a plus or minus volt per ampere charge or discharge dependent upon current flow through the shunt and to a second operational amplifier having an output signal determining charge or discharge.

5. The computer programmed battery charge control system as set forth in claim 1, wherein the voltage sense means comprises a voltage divider having a pair of resistors and a ground for producing said voltage equivalent to said computer reference voltage.

6. The computer programmed battery charge control system as set forth in claim 1, wherein the awake means comprises as inverting input operational amplifier with its output through a NAND gate and a following inverter and producing the awake signal.

7. The computer programmed battery charge control system as set forth in claim 6, wherein said NAND gate is triggered by an inverter and one shot circuit from a plug-in connection of a charge circuit.

8. The computer programmed battery charge control system as set forth in claim 1, wherein the awake means comprises an inverting input operational amplifier with its output through a NAND gate and a following first inverter and producing the awake signal, and a flip flop circuit responsive to the awake signal and with its output to the second relay switch to close and energize the computer.

9. The computer programmed battery charge control system as set forth in claim 8, wherein the flip flop is manually triggered by means of a switch to ground.

10. The computer programmed battery charge control system as set forth in claim 9, wherein the computer means has means therein for calibrating the system to a known battery capacity remaining level in response to manual operation of said switch to ground.

11. The computer programmed battery charge control system as set forth in claim 8, wherein the flip flop is automatically triggered by sleep means for de-energizing the computer at spaced intervals of time by an oscillator and counter circuit means.

12. The computer programmed battery charge control system as set forth in claim 11, wherein the computer has means therein responsive to the flip flop triggered by the oscillator and counter circuit for repowering it at said spaced intervals of time.

13. The computer programmed battery charge control system as set forth in claim 8, wherein an external memory means is in circuit with the computer for storing battery capacity remaining data and for retaining the same lost from the computer internal memory in its sleep mode, and with means for restoring said data into the computer internal memory when the second relay switch is closed to power up the system.

14. The computer programmed battery charge control system as set forth in claim 13, wherein a readout means in common circuit with the external memory means is programmed by means in the computer for displaying the battery capacity remaining data.

15. The computer programmed battery charge control system as set forth in claim 13, wherein the computer has means therein for carrying data to and from the external memory means.

16. The computer programmed battery charge control system as set forth in claim 13, wherein the computer has means therein for carrying data to and from the external memory means, and including enable and write means activating the same.

17. The computer programmed battery charge control system as set forth in claim 8, wherein the computer has means therein responsive to the capacity remaining data in a fully charged condition for setting the flip flop in a sleep condition by deenergizing the second relay switch.

18. The computer programmed battery charge control system as set forth in claim 8, wherein the flip flop is automatically triggered by sleep means at spaced intervals of time by an oscillator and counter circuit means, wherein an external memory is in circuit with the counter for storing battery capacity remaining data lost from the computer internal memory in its sleep mode, and with means for restoring said data into the computer internal memory when the second relay switch is closed to power up the system, wherein the readout means is a multi segment readout means for displaying a distinct "power interrupt" indicia indicating that there has been a power failure and a loss of data from the computer internal memory as a functional failure, and wherein the computer has means therein responsive to a switch to ground for restoring the system at a known battery capacity remaining level and for producing a multiplicity of segment signals to said readout means for displaying said indicia.

19. The computer programmed battery charge control system as set forth in claim 1, wherein a readout means is programmed by means in the computer for displaying the battery remaining data.

20. The computer programmed battery charge control system as set forth in claim 19, wherein the readout is a multi segment readout means, and wherein the computer means has means therein responsive to battery capacity remaining data for producing a multiplicity of segment signals to said readout means for displaying the battery capacity remaining data.

21. The computer programmed battery charge control system as set forth in claim 19, wherein the readout means is a multi segment readout means for displaying a "capacity remaining" range of distinct indicia and a distinct indicia indicating "fully charged", and wherein the computer has means therein responsive to battery capacity remaining data for producing a multiplicity of segment signals to said readout means for displaying battery condition by one of said range of indicia or by the second mentioned indicia.

22. The computer programmed battery charge control system as set forth in claim 19, wherein the readout means is a multi segment readout means for displaying a "capacity remaining" range of distinct indicia and a distinct indicia indicating "fully charged", wherein the computer has means therein responsive to battery capacity remaining data for producing a multiplicity of segment signals to said readout means for displaying battery condition by one of said range of distinct indicia or by the second mentioned indicia, and wherein an external memory means is in circuit with the computer for storing battery remaining data lost from the computer internal memory in its sleep mode, and with means for restoring said data into the computer internal memory when the second relay switch is closed to power up the system.

23. The computer programmed battery charge control system as set forth in claim 1, wherein a means responsive to said voltage sense means, current sense means and polarity sense means produces a total pulse for operating a counter means.

24. The computer programmed battery charge control system as set forth in claim 23, wherein the readout means is a seven segment readout means for displaying a distinct "total-sending" indicia for a time interval required to total the ampere hours remaining and indicating that the counter is operating, and wherein the computer has means therein resonsive to the current and polarity sense means for reading ampere hours and for producing pulses to operate the counter.

25. The computer programmed battery charge control system as set forth in claim 1, wherein a computer means for matching battery rated capacity in ampere hours includes at least one or a combination of shunts shorting across a resistor for determining a limit of battery charge.

26. The computer programmed battery charge control system as set forth in claim 1, wherein the computer has means therein for producing the awake signal when shunt current exceeds a certain value of charge or discharge.

27. The computer programmed battery charge control system as set forth in claim 1, wherein the computer has means therein for energizing the first relay switch.

28. The computer programmed battery charge control system as set forth in claim 1, wherein the computer has means therein for energizing the first relay switch through an inverter.

29. The computer programmed battery charge control system as set forth in claim 1, wherein the computer has means therein with an output to indicate a low battery condition.

30. The computer programmed battery charge control system as set forth in claim 1, wherein the computer has means therein with an output signaling through an inverter to indicate a low battery condition.

31. The computer programmed battery charge control system as set forth in claim 1, wherein the computer has means therein for causing the input of the computer to go low when it is connected to ground through a plug-in connection thereby activating the system.

32. The computer programmed battery charge control system as set forth in claim 1, wherein the readout means is a multi segment readout means for displaying a distinct "bad battery" range of indicia indicating that the battery is not accepting the charge current as a functional failure, and wherein the computer has means therein responsive to the current and polarity sense means for intermittently producing a multiplicity of segment signals to said readout means for displaying battery condition by flashing said indicia at said readout means.

33. The computer programmed battery charge control system as set forth in claim 1, wherein the readout means is a multi segment readout means for displaying a distinct "bad battery" range of indicia indicating that the battery is not accepting the charge current as a functional failure, wherein the computer has means therein responsive to the current and polarity sense means for intermittently producing a multiplicity of segment signals to said readout means for displaying battery condition by flashing said indicia at said readout means, and wherein an external memory means is in circuit with the computer for storing battery capacity remaining data from the computer internal memory in its sleep mode, and with means for restoring said data into the computer internal memory when the second relay switch is closed to power up the system.

34. The computer programmed battery charge control system as set forth in claim 1, wherein the readout means is a multi segment readout means for displaying a distinct "bad battery" indicia indicating that the battery has an abnormal internal resistance as a functional failure, and wherein the computer has means therein responsive to the voltage and polarity sense means for producing a multiplicity of segment signals to said readout means for displaying said indicia.

35. The computer programmed battery charge control system as set forth in claim 2, wherein the readout means is a multi segment readout means for displaying a distinct "bad battery" indicia indicating that the battery has an abnormal internal resistance as a functional failure, wherein the computer has means therein responsive to the voltage and polarity sense means for producing a multiplicity of segment signals to said readout means for displaying said indicia, and wherein an external memory means is in circuit with the computer for storing battery capacity remaining data lost from the computer internal memory in its sleep mode, and with means for restoring said data into the computer internal memory when the second relay switch is closed to power up the system.

36. The computer programmed battery charge control system as set forth in claim 1, wherein the readout means is a multi segment readout means for displaying a distinct "low battery" indicia indicating that the battery is deeply discharged as a functional failure, and wherein the computer has means therein responsive to the current and polarity sense means for producing a multiplicity of segment signals to said readout means for displaying said indicia.

37. The computer programmed battery charge control system as set forth in claim 1, wherein the readout means is a multi segment readout means for displaying a distinct "low battery" indicia indicating that the battery is deeply discharged as a functional failure, wherein the computer has means therein responsive to the current and polarity sense means for producing a multiplicity of segment signals to said readout means for displaying said indicia, and wherein an external memory means is in circuit with the computer for storing battery capacity remaining data lost from the computer internal memory in its sleep mode, and with means for restoring said data into the computer internal memory when the second relay switch is closed to power up the system.

38. The computer programmed battery charge control system as set forth in claim 1, wherein the readout means is a multi segment readout means for displaying a distinct "start of charge" indicia for a short time interval indicating that the charge function is in operation as a functional condition, and wherein the computer has means therein responsive to the current and polarity sense means and has a clock means and for producing a multiplicity of segment signals to said readout means for said short interval for displaying said indicia.

39. The computer programmed battery charge control system as set forth in claim 1, wherein the readout means is a multi segment readout means for displaying a distinct "start of discharge" indicia for a short time interval indicating that the discharge function is in process as a functional condition, and wherein the computer has means therein responsive to the current and polarity sense means and has a clock means and for producing a multiplicity of segment signals to said readout means for said short interval for displaying said indicia.

40. The computer programmed battery charge control system as set forth in claim 1, wherein the readout means is a multi segment readout means for continuously displaying a distinct "charger not connected" indicia indicating that the charge is not conducting to the battery when the system is connected and in the awake mode, and wherein the computer has means therein responsive to the current and polarity sense means for producing a multiplicity of segment signals to said readout means for displaying said indicia.

* * * * *